(12) United States Patent
Desnoyer et al.

(10) Patent No.: US 10,982,718 B2
(45) Date of Patent: Apr. 20, 2021

(54) ROLLER BEARING EQUIPPED WITH A SEALING

(71) Applicant: NTN-SNR ROULEMENTS, Annecy (FR)

(72) Inventors: Fabien Desnoyer, Annecy (FR); Alexandre Curtet, Saint Girod (FR)

(73) Assignee: NTN-SNR Roulements, Annecy (FR)

(*) Notice: Subject to any disclaimer, the term of this patent is extended or adjusted under 35 U.S.C. 154(b) by 0 days.

(21) Appl. No.: 16/734,493

(22) Filed: Jan. 6, 2020

(65) Prior Publication Data
US 2020/0224723 A1    Jul. 16, 2020

(30) Foreign Application Priority Data
Jan. 11, 2019 (FR) .................................... 1900273

(51) Int. Cl.
*F16C 33/78* (2006.01)
(52) U.S. Cl.
CPC ...... *F16C 33/7823* (2013.01); *F16C 33/7889* (2013.01)
(58) Field of Classification Search
CPC .............. F16C 33/7823; F16C 33/7886; F16C 2326/02
See application file for complete search history.

(56) References Cited

U.S. PATENT DOCUMENTS

| | | | |
|---|---|---|---|
| 2016/0178010 A1* | 6/2016 | Kaiser | F16C 33/7886 277/351 |
| 2016/0186815 A1* | 6/2016 | Walter | F16C 33/783 277/351 |

FOREIGN PATENT DOCUMENTS

| | | | | |
|---|---|---|---|---|
| DE | 102018105832 A1 * | 9/2019 | | F16J 15/3256 |
| WO | WO-2017055724 A1 * | 4/2017 | | F16C 33/782 |
| WO | 2018192597 A1 | 10/2018 | | |

* cited by examiner

*Primary Examiner* — Phillip A Johnson
(74) *Attorney, Agent, or Firm* — Murtha Cullina LLP

(57) ABSTRACT

The invention relates to a rolling bearing equipped with a sealing device having a frame fixed to a first organ. The first organ has a downstream sector bearing a sealing element and presenting a U-shaped geometry formed of an axial bottom surrounded with an inner wall and an outer wall at its edges. The outer wall is extended by a deflector that separates, with the U-shaped geometry, the sealing chamber into an inner compartment and an outer compartment. The bearing also includes a wall fixed to second organ, which presents an outside section forming with the deflector a reduced sealing clearance between the outside opening of the chamber and the outer compartment. The deflector has an outer surface placed in the outer compartment and is slanted towards the opening at an angle β from 10° to 80° relative to a radial direction.

16 Claims, 1 Drawing Sheet

ROLLER BEARING EQUIPPED WITH A SEALING

CROSS-REFERENCE TO RELATED APPLICATION

This application claims the priority of French patent application number 19 00273, filed on Jan. 11, 2019, the entire contents of which are incorporated herein by reference.

TECHNICAL FIELD

The invention relates to a rolling bearing made up of two organs and rolling elements placed in a rolling area formed between the organs to enable their relative rotation around an axis.

BACKGROUND

In particular, the invention applies to rolling bearings for motor vehicles and especially to wheel bearings. On an advantageous basis, a bearing under the invention enables mounting of a driving or non-driving wheel on a motor vehicle, one organ being rotary and including means for fixing the wheel, while the other organ is fixed and includes means for fixing it to a vehicle suspension element.

To prevent, on the one hand, leaks of lubricant present in the rolling area and, on the other hand, contamination of the area by outside pollutants, at least one side of the rolling area can be equipped with a sealing device.

In particular, the sealing device can include a frame fixed to a first organ and a wall fixed to the second organ, with the frame fitted with a dynamic sealing element that presents at least one lip placed in rubbing contact with a section of the wall.

To comply with increasingly severe sets of specifications covering seals, in particular for validation of wheel bearings by the motor vehicle manufacturers, this solution leads to major friction torque which, over and above its negative impact on the energy necessary for rotation of the bearing, leads to a high operating temperature level and hence premature wear of the rubbing lip.

Moreover, such wear is all the more rapid in that pollutants can enter at the level of the rubbing section and stay there during rotation.

To attempt to solve this problem, it is possible to propose adding deflectors to form an entry chicane that is arranged in such a way as to limit exchanges between the rolling area and the outside, in particular at the level of the rubbing section.

In particular, document WO-2018/192597 provides for a rolling bearing in which at least one side of the rolling area presents an annular chamber in communication with the outside via an opening, with the bearing being fitted with a sealing device as set out above, in which:

The frame presents a downstream sector placed in the chamber, forming on either side an inner compartment, with which the opening communicates, and an outer compartment in communication with the rolling area and in which is placed at least one rubbing lip, with the downstream sector having a U-shaped geometry whose outside wall forms a deflector that extends into the chamber while separating with the U-shaped geometry the inner and outer compartments;

The sealing wall presents an outside section that borders the chamber over an axial depth from the opening, forming with the deflector a reduced sealing clearance between the opening and the outer compartment.

Thus the risk of penetration of outside pollutants into the rolling area is limited thanks to:

A deflector to form an obstacle to entry of the pollutants into the outer compartment in which the rubbing lip is placed; and Formation upstream from the deflector of a U-shaped inner compartment of a suitable size to recover the outside pollutants entering via the opening, with the possibility of emptying the inner compartment by gravity without polluting the outer compartment.

However, this solution is not entirely satisfactory, in that the deflector presents a geometry which, in the event of entry of pollutants into the outer compartment, makes their gravity extraction difficult and hence leads to permanent pollution of the rubbing section.

The invention is aimed at perfecting prior art by proposing in particular a rolling bearing equipped with a sealing device whose sealing interface is optimised, in particular by being arranged in such a way as to facilitate gravity extraction of potential pollutants entered in the interface.

For this purpose, the invention proposes a rolling bearing that includes two organs and rolling elements placed in a rolling area formed between the organs to enable their relative rotation around an axis, with at least one side of the rolling area presenting an annular chamber in communication with the outside via an opening, and with the bearing being equipped with a sealing device including:

A frame fixed to a first organ, with the frame presenting a downstream sector placed in the chamber, forming on each side an inner compartment and an outer compartment, with the downstream sector bearing a sealing element and presenting a U-shaped geometry formed of a sensibly axial bottom surrounded at its edges by two walls—inner and outer respectively—each presenting a radial height, with the outer wall being extended by a deflector of the sealing element that extends into the chamber while separating the inner and outer compartments with the U-shaped geometry;

A wall fixed to the second organ, the wall presenting an outside section that borders the chamber over an axial depth from the opening, forming with the deflector a reduced sealing clearance between the opening and the outer compartment, the deflector presenting an outer surface placed in the outer compartment, with the outer surface being slanted towards the opening at an angle $\beta$ lying between 10° and 80° relative to with a radial direction.

BRIEF DESCRIPTION OF THE DRAWINGS

Other purposes and advantages of the invention are set out in the following description, made with reference to the attached figures, in which.

DETAILED DESCRIPTION

Figure 1:
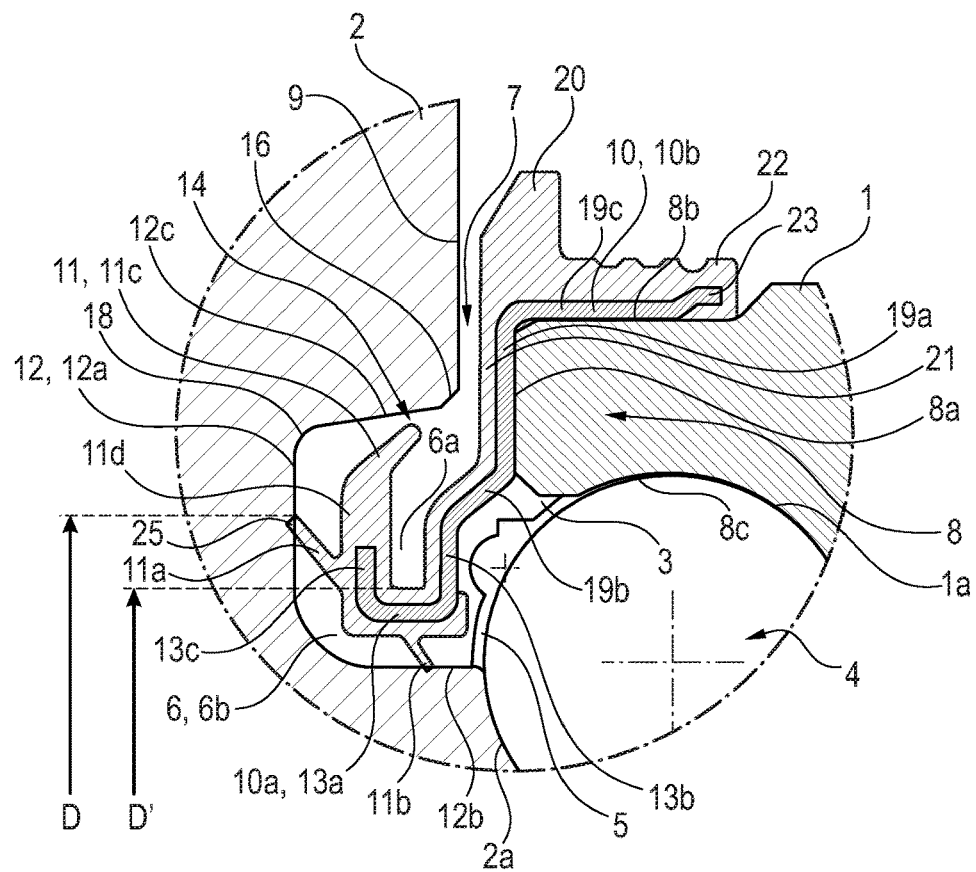
FIG. 1 represents partially and in a longitudinal cross-section view, a rolling bearing equipped with a sealing device according to one embodiment of the invention.

In relation with these figures, a rolling bearing is described below, in particular for mounting a driven or non-driven wheel on a motor vehicle.

The bearing includes two organs, i.e. in the figures a first organ 1 placed outside and fixed, and a second organ 2 placed inside and rotating. In the application considered, the wheel is intended to be associated with the inside organ 2 and the outside organ 1 can present means for fixing the bearing on a suspension element of the motor vehicle.

Between these two organs 1, 2, a rolling area 3 is formed to enable relative rotation of the organs around an axis. In this description, the spatial positioning terms are taken with reference to the bearing rotation axis (horizontal in the figures). In particular:

The term "inside" refers to a position close to that axis, and the term "outside" refers to a position further away from that axis;

The terms "axial" and "radial" refer to a direction respectively along that axis and moving towards or away from it.

To enable rotation, each organ 1, 2 can present two rolling tracks 1a, 2a set apart axially in such a way as to form in the rolling area 3 two rolling paths in which are placed respectively a row of rolling elements 4, with the rolling elements taking the form, for example, of balls that are held in a row by a retention cage 5.

However, the invention is not limited to one embodiment of the bearing, in particular as regards the geometry of the rolling elements 4, or the geometry and/or the relative layout of the fixed and rotating organs.

The figures represent one side of the rolling area 3 that presents an annular chamber 6 in communication with the outside via an annular opening 7 formed between the organs 1, 2.

In this embodiment, the first organ 1 presents an extension 8 delimiting the opening 7 with an outside wall 9 from the second organ 2, the extension taking the form of a ring with a sensibly rectangular cross-section delimited by a radial end wall 8a, an outside axial wall 8b and an inside wall 8c extending mainly in the axial direction and on which part of the rolling track 1a is formed.

To prevent, on the one hand, leaks of lubricant present in the rolling area 3 and, on the other hand, contamination of the area by outside pollutants, due in particular to sludge, the chamber 6 is equipped with a sealing device.

The sealing device includes:

A frame 10 fixed to a first organ 1, and fitted with a dynamic sealing element 11 including at least one lip 11a, 11b placed in the chamber 6;

A wall 12 fixed to the second organ 2 extending into the chamber 6, and against which the lip 11a, 11b is in rubbing contact.

The frame 10 can be made of a metal material, in particular by folding a pressed-steel sheet.

In the figures, the wall 12 is formed in the second organ 2. As a variant, the wall 12 can be formed on a part added to the second organ 2, with the piece also being able to present a structure similar to the frame 10, in particular by being formed by folding a pressed-steel sheet.

The frame 10 presents a downstream sector 10a bearing the sealing element 11, with the sector being placed in the chamber 6, forming on each side an inner compartment 6a and an outer compartment 6b.

In the description, the terms "upstream" and "downstream" are defined relative to the direction of entry of pollutants in the opening 7, from the outside towards the inside. Moreover, the terms "outer" and "inner" are defined relative to the orientation of the bearing as represented, and they refer to a position on the left and right respectively in the figures.

In the embodiment represented, the dynamic sealing is enhanced by providing that the sealing element 11 presents two lips 11a, 11b placed in the outer compartment 6b and in rubbing contact at two separate locations on the wall 12. As a variant, at least one lip 11a, 11b can form a sealing clearance with the wall 12.

In the embodiment represented, the wall 12 presents:

A radial section 12a, on which an outside lip 11a is in rubbing contact, to form an obstacle to penetration of outside pollutants into the rolling area 3; and An axial section 12b placed as an extension to the rolling track 2a, in particular by extending between the rolling track and the radial section 12a, and on which an inside lip 11b is in rubbing contact, to form an obstacle to leakage of lubricants out of the rolling area.

The downstream sector 10a presents a U-shaped geometry formed of a sensibly axial bottom 13a surrounded with two walls on its edges—respectively inner 13b and outer 13c—each presenting a radial height, with the outer wall 13c being extended by a deflector 11c of the sealing element 11 that extends into the chamber 6, separating with the U-shaped geometry the inner compartment 6a from the outer compartment 6b.

The U-shaped geometry enables formation in the inner compartment 6a of a recovery zone for outside pollutants entering via the opening 7, with the length of the bottom 13a and/or the height of the radial walls 13b, 13c being great enough to contain the pollutants in the zone, and hence limit their penetration into the outer compartment 6b.

To enhance both the dynamic sealing and the radial compactness of the bearing, the outside lip 11a presents an outside end 25 in rubbing contact on the radial section 12a, while being placed on a diameter D that is greater than the diameter D' of the bottom 13a of the U-shaped geometry.

To limit entry of outside pollutants into the outer compartment 6b, the wall 12 presents an outside section 12c linked to the radial section 12a by a fillet 18, with the outside section bordering the chamber 6 over an axial depth from the opening 7, and forming with the deflector 11c a reduced sealing clearance 14 between the opening and the outer compartment.

The deflector 11c presents a free end 15 that is placed radially opposite the outside section 12c, with the sealing clearance 14 being formed between the free end and the outside section.

In particular, the outside section 12c and the opening 7 present a common edge 16 relative to which the free end 15 is set back axially, thus preventing the drawback of outside pollutants coming from the opening 7 and flowing directly on the deflector 11c, and hence limiting the risks of entry of the pollutants into the outer compartment 6b.

Figure 1A:
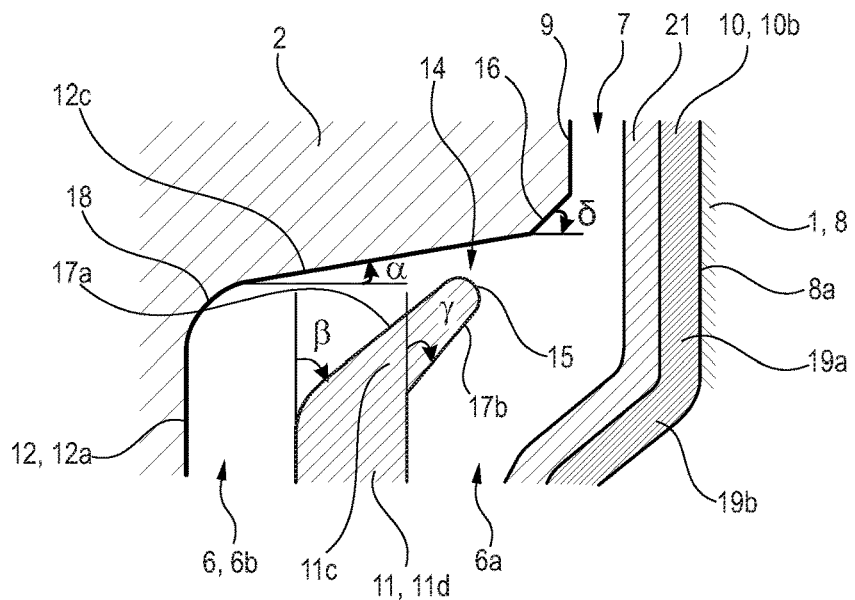
FIG. 1a is an enlarged view of FIG. 1, centred on the reduced sealing clearance formed at the interface between the deflector and the outside section of the sealing wall.

In relation to FIG. 1a, the deflector 11c presents an outer surface 17a that is positioned in the outer compartment 6b and slanted towards the opening 7 at an angle $\beta$ lying between 10° and 80°, in particular between 40° and 60°, relative to a radial direction.

Thus the outer surface 17a forms a slope to guide towards the outside potential pollutants contained in the outer compartment 6b, which enables to facilitate the evacuation of the pollutants from the outer compartment by centrifugation and/or gravity.

To enhance guidance of pollutants out of the outer compartment 6b, the outside section 12c is slanted on the outside at an angle $\alpha$ of less than 30° relative to an axial direction.

On an advantageous basis, the slant angle $\beta$ of the outer surface 17a and the slant angle $\alpha$ of the outside section 12c are such that: $\beta=-\alpha/2+\theta$, with $\theta$ being a positive angle greater than α/2 and less than 80°, so that β is greater than α. In particular, the angle θ can be of the order of 45°.

In the figures, the sealing element 11 presents a crown 11d positioned in the radial prolongation of the outer wall 13c, with the deflector 11c extending from the crown.

In particular, the crown 11d has a greater thickness than that of the deflector 11c, in such a way that it is possible to position the deflector very close to the outside section 12c, and hence reduce the dimensions of the sealing clearance 14, while limiting the radial height of the deflector, in order to limit its bending when pollutants flow over it.

To reliably ensure the absence of transfer of pollutants from the inner compartment 6a to the outer compartment 6b, the deflector 11c presents an inner surface 17b positioned in the inner compartment, surrounding the bottom 13a of the U-shaped geometry.

In particular, the inner surface 17b is slanted towards the opening at an angle γ lying between 40° and 60° relative to a radial direction, which enables potential pollutants contained in the inner compartment 6a to be guided towards the opening 7.

In the embodiment represented, the angle α is measured relative to an axial direction in the trigonometrical direction, with the angles β and γ being measured in the anti-trigonometrical direction relative to a radial direction. In particular, the outer surface 17a and the inner surface 17b are slanted towards the opening 7 relative to the radial direction of respectively one side of the crown 11d.

In relation to FIG. 1a, the angle γ of the inner surface 17b is smaller than the angle β of the outer surface 17a in order to form a deflector with conical geometry that tapers from the crown 11c towards its free end 15.

On an advantageous basis, the inner surface 17b is positioned sensibly in the alignment of the common edge 16 between the opening 7 and the outside section 12c, which enables guidance of pollutants from the inner surface directly towards the opening. In particular, the common edge 16 presents a bevel at an angle δ sensibly equal to the angle γ of the inner surface 17b.

In the embodiment represented, the frame 10 presents an upstream sector 10b linking it to the outside organ 1, with the upstream sector presenting a radial wall 19a extended:

At its inside end by a conical wall 19b linking the radial wall to the inner wall 13b of the downstream sector 10a, and;

At its outside end, by an outside wall 19c that is sensibly axial;

The radial wall 19a and the outside wall 19c being positioned against respectively the end wall 8a and the outside wall 8b of the extension 8.

On an advantageous basis, the conical geometry of the wall 19b linking the upstream sector 10b and the downstream sector 10a enables axial separation of the downstream sector from the rolling area, and also enables positioning of the free end 15 of the deflector 11c set back axially from the opening 7, with the advantages mentioned previously.

In the figures, the opening 7 is formed at least partially between the upstream sector 10b and the second organ 2. In particular, to limit entry of outside pollutants into the opening 7, the upstream sector 10b has:

A deflector 20, sensibly radial, which is interposed between the outside and the upstream part of the opening 7, in order to form a chicane to prevent the entry of outside pollutants; and A sealing membrane 21 positioned on the radial wall 19a and axially facing the inside portion of the wall 9, able to form with the inside portion an opening 7 with reduced axial dimension.

Moreover, the outside sector 10b presents a bead 22 that is positioned up against the extension 8 to form a static seal. In particular, the outside wall 19c presents a free edge 23 offset radially in order to enable contact between the bead 22 and the outside axial wall 8b and hence ensure a static seal.

The sealing element 11 can be associated by overmoulding with the frame 10. In particular, the sealing element can be made of a flexible material, such as an elastomer for example, in particular based on nitrile butadiene rubber (NBR) copolymer, mechanically reinforced if necessary by fillers such as carbon black, or on hydrogenated NBR (HNBR), fluoropolymer or polyacrylate.

What is claimed is:

1. A rolling bearing made up of a first organ, a second organ and rolling elements placed in a rolling area formed between the first organ and the second organ to enable relative rotation of the first organ and the second organ around an axis, with at least one side of the rolling area presenting an annular chamber in communication with the outside via an opening, with the bearing being equipped with a sealing device including:

A frame fixed to the first organ, with the frame presenting a downstream sector placed in the chamber forming on each side an inner compartment and an outer compartment, with the downstream sector bearing a sealing element and presenting a U-shaped geometry formed of an axial bottom with edges surrounded by an inner wall and an outer wall, each wall presenting a radial height, with the outer wall being extended by a deflector on the sealing element that extends into the chamber while separating the inner compartment and the outer compartment with the U-shaped geometry;

A wall fixed to the second organ, the wall presenting an outside section that borders the chamber over an axial depth from the opening forming with the deflector a reduced sealing clearance between the opening and the outer compartment, the bearing wherein by the fact that the deflector presents an outer surface placed in the outer compartment, with the outer surface being slanted towards the opening at an angle β from 10° to 80° relative to a radial direction.

2. The rolling bearing according to claim 1, wherein the angle β is from 40° to 60°.

3. The rolling bearing according to claim 1, wherein the deflector presents an inner surface placed in the inner compartment, with the inner surface surrounding the bottom of the U-shaped geometry.

4. The rolling bearing according to claim 3, wherein the inner surface is slanted towards the opening at an angle γ from 40° to 60° relative to a radial direction.

5. The rolling bearing according to claim 4, wherein the angle γ of the inner surface is smaller than the angle β of the outer surface.

6. The rolling bearing according to claim 4, wherein the outside section presents a common edge with the opening, the inner surface being placed in the alignment of the edge.

7. The rolling bearing according to claim 1, wherein the deflector presents a free end that is placed radially opposite the outside section.

8. The rolling bearing according to claim 1, wherein the outside section is slanted on the outside at an angle α of less than 30° relative to an axial direction.

9. The rolling bearing according to claim 8, wherein the slant angle β of the outer surface and the slant angle α of the outside section are such that: β=−α/2+θ, with θ being a positive angle greater than α/2 and less than 80°, so that β is greater than α.

10. The rolling bearing according to claim 1, wherein the sealing element presents a lip placed in the outer compartment.

11. The rolling bearing according to claim 10, wherein the lip presents an outside end in rubbing contact on the radial section, with the outside end placed on a diameter D that is greater than the diameter D' of the bottom of the U-shaped geometry.

12. The rolling bearing according to claim 1, wherein the wall presents an axial section placed in the extension of a rolling track of the second organ, with the sealing element presenting a lip placed in the outer compartment.

13. The rolling bearing according to claim 1, wherein the wall is formed in the second organ.

14. The rolling bearing according to claim 1, wherein the sealing element presents a crown placed in the radial extension of the outer wall, with the deflector extending from the crown.

15. The rolling bearing according to claim 1, wherein the frame presents an upstream sector linked to the first organ.

16. The rolling bearing according to claim 15, wherein the upstream sector has a deflector that is interposed between the outside and the upstream part of the opening.

\* \* \* \* \*